May 14, 1968            D. A. SHAW            3,382,634
SHEAR HEAD
Filed Jan. 7, 1966            2 Sheets-Sheet 1
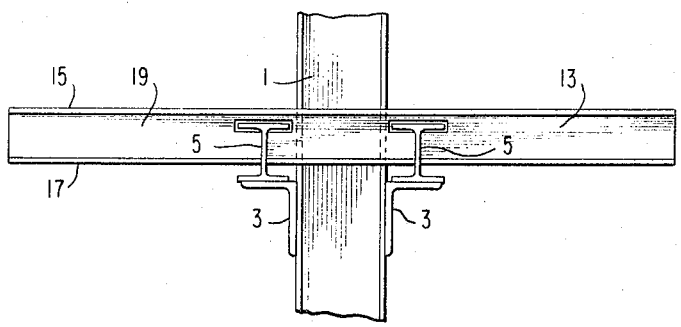
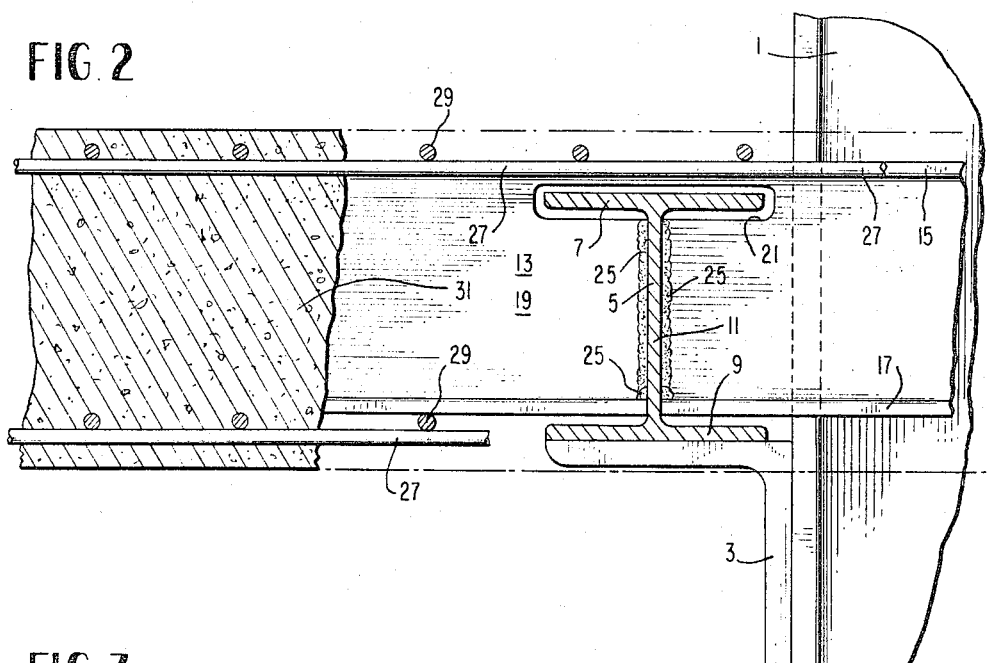
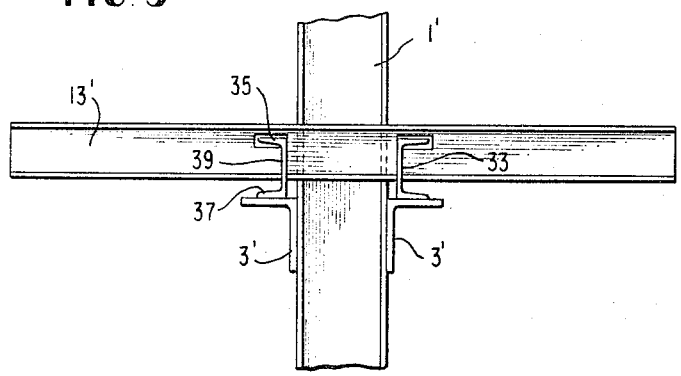
INVENTOR
DONALD A. SHAW
BY Young & Thompson
ATTORNEYS May 14, 1968     D. A. SHAW     3,382,634
SHEAR HEAD Filed Jan. 7, 1966     2 Sheets-Sheet 2

INVENTOR
DONALD A. SHAW

United States Patent Office 3,382,634
Patented May 14, 1968

3,382,634
SHEAR HEAD
Donald A. Shaw, Lynchburg, Va., assignor to Montague-Betts Company, Inc., Lynchburg, Va.
Filed Jan. 7, 1966, Ser. No. 519,331
6 Claims. (Cl. 52—251)

ABSTRACT OF THE DISCLOSURE

The beams that intersect at a shear head are slightly offset from each other vertically. The higher of the beams is cut only through its web and lower flange to receive the web and upper flange of the lower of the beams. In this way, the upper flanges of the beams are preserved intact. The reinforcing rods are also nested within the assembly to some extent, so as to keep the total height of the assembly to a minimum.

---

The present invention relates to shear heads in structural steel construction.

A shear head is a support structure characterized by an upright column and a plurality of horizontal members supported by the column and crossing each other adjacent the column. These members extend in cantilever relationship in different directions from the column and support a horizontal partition of the building, such as a floor or ceiling or the like.

In one type of shear head as known heretofore, suitable for use with a column that is spaced a substantial distance from any wall, there have been provided two pairs of horizontal members. The members of each pair are parallel to each other and are disposed one on either side of the column. One pair of members is perpendicular to the other pair of members, so that the four horizontal members in effect box the column. In this known construction of shear head, all four members are coplanar. Thus, the upper and lower flanges of the members are also coplanar. In order to cause the members to cross, therefore, it is permissible to maintain one pair of members intact; but the other pair of members must be cut, each in three pieces with the flanges of the members cut back to accommodate and butt against the edges of the flanges of the intact members of the other pair. Alternatively, instead of cutting only the one pair of members, both pairs of members can be half cut. The assembly is then welded together; and if the shear head was not assembled in place, it can then be lowered over the column for erection.

These and other known shear heads suffer from the great disadvantage that their limiting strength is the strength of their welds. The original strength of the horizontal members is not necessarily recovered upon reassembly of the cut and welded sections. Another great disadvantage is that the labor cost of producing such shear heads is quite high, as a great deal of cutting and fitting and welding is required. Moreover, the horizontal partitions thus produced tend to be undesirably thick and heavy.

Accordingly, it is an object of the present invention to provide a shear head in which retention of substantially the original strength of the horizontal members is ensured.

Another object of the present invention is the production of a shear head whose assembly is greatly simplified and whose cost is accordingly reduced.

Other objects and advantages of the present invention will become apparent from a consideration of the following description, taken in connection with the accompanying drawings, in which:

FIGURE 1 is a side elevational view of a shear head according to the present invention;

FIGURE 2 is an enlarged fragmentary view of a portion of a shear head according to the present invention, with parts broken away for clarity of illustration;

FIGURE 3 is a view similar to FIG. 1 but showing another embodiment of the invention;

Figure 4:
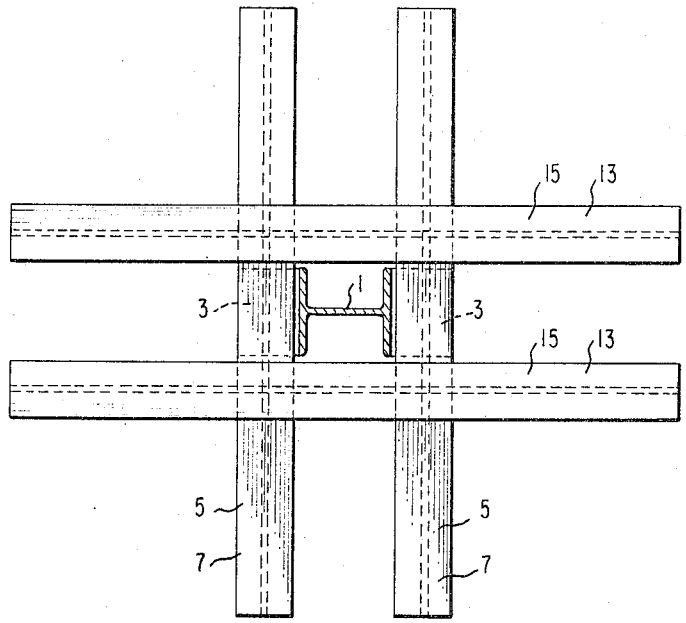
FIGURE 4 is a top plan view of a shear head according to the present invention.

Referring now to the drawings in greater detail, and first to FIGS. 1 and 2 thereof, there is shown as an illustrative embodiment a shear head assembly supported by a column 1, which is provided with seats 3 secured thereto as by riveting or welding or the like. Instead of a steel column, the column 1 may be a concrete column. A pair of parallel horizontal first members 5 rest on seats 3 and are thus supported by column 1. Members 5 are disposed one on either side of column 1 and are wide flange beams having a horizontal upper flange 7 and a horizontal lower flange 9 and a vertical web 11 extending between and interconnecting flanges 7 and 9.

A pair of second members 13 are also provided, which are horizontal and parallel to each other and disposed one on either side of column 1 but perpendicular to members 5. Second members 13 are identical to first members 5 in the illustrated embodiment, and thus are comprised of a horizontal upper flange 15 and a horizontal lower flange 17 and a vertical web 19 that extends between and interconnects flanges 15 and 17. Second members 13 are supported on first members 5.

First members 5 are intact, but second members 13 are not. Instead, each second member 13 is provided with a pair of spaced horizontally elongated holes 21 through an upper portion of the web 19, and a vertically extending slot 23 each of which extends from the midpoint of hole 21 down through web 19 and flange 17. In the undeformed position of second member 13, shown in FIG. 5, hole 21 is larger than upper flange 7 of first member 5 in both directions, so that there is ample clearance between flange 7 and hole 21; but slot 23 is of substantially exactly the thickness of web 11 of first member 5. To this end, hole 21 can be formed by burning, as its precise dimensions are not important; but slot 23 should be accurately cut square, as by sawing.

As can be best seen in FIG. 2, in the assembled condition of members 5 and 13, upper flange 7 of first member 5 is disposed in hole 21 of second members 13; while at least a portion of web 11 of first member 5 is disposed in slot 23 of second members 13, with the marginal edges of lower flange 17 and web 19 of the second member 13 pressing against web 11. These marginal edges and the marginal edges of flanges 17 are preferably also secured to web 11 as by welding at 25 to stabilize the assembly and locate members 5 and 13 relative to each other and to transmit to members 5 the load carried by members 13.

As is also conventional in the case of shear heads, reinforcing bars are supported by the shear head adjacent the upper and lower surfaces of the horizontal members. In the illustrated embodiment, first reinforcing bars 27 are provided, about half of which are disposed above and extend perpendicular to first member 5 and parallel to second members 13 and are spaced apart from and parallel to each other; while the remaining first bars 27 are disposed beneath lower flange 17 of second member 13 on about the same level as lower flange 9 of first member 5 and are cut off as seen in FIG. 2 to avoid interference with flange 9. Second reinforcing bars 29 are also provided, which have the same relationship to second members 13 as first bars 27 have to first members 5: specifically, about half the second bars 29 are disposed above upper flanges 15 of second members 13, while the rest of the second bars 29 are beneath the lower flanges 17 of second members 13, all the second bars 29 being parallel to and spaced apart from each other and parallel to first members 5 and perpendicular to second members 13.

In assembling the bars 27 and 29, it is often convenient to support them from each other as by tying them together at their points of intersection by means of twisted wire connectors (not shown). It may also be convenient to support the upper bars 27 or 29 or both on the underlying flanges 7 or 15, respectively. But whatever the arrangement of bars 27 and 29, they should be positioned as far as possible from the neutral plane of the partition, so as to provide maximum reinforcement.

When the horizontal partition is completed, it is of course to be understood that concrete 31 will fill the skeleton which is provided by the structural steel described thus far and will in fact extend somewhat above the upper bars 29 and somewhat below the lower bars 27. It is also to be understood that although FIG. 2 illustrates the finished form of the horizontal partition itself, the column 1 will ordinarily be boxed; but for purposes of clarity, the treatment of column 1 is not shown in FIG. 2.

The present invention is not restricted to the use of horizontal members comprising wide flange beams. Instead, other shapes may be used, such as I beams and channel beams. Moreover, it is not necessary that the members of one pair be identical to those of the other pair. Various shapes can be mixed, and different sizes of the same shape can also be mixed.

In FIG. 3, therefore, a modification is illustrated which uses channels. As is there shown, channels 33 are provided, which have upper flanges 35 and lower flanges 37 and vertical webs 39 with the webs 39 back-to-back on the column or inner side and the flanges facing outwardly. The cuts made in the other pair of channels are of course of appropriate size and shape to receive this different shape of member.

Figure 5:
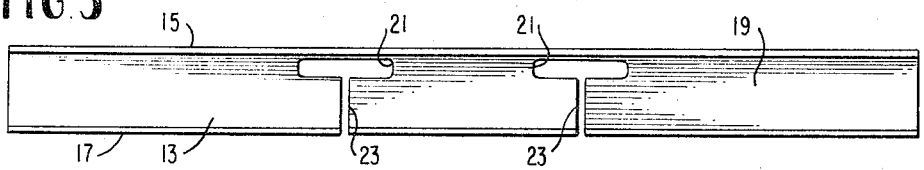
FIGURES 5, 6 and 7 are views showing successive stages in the fabrication and assembly of one form of shear head according to the present invention.
Figure 6:
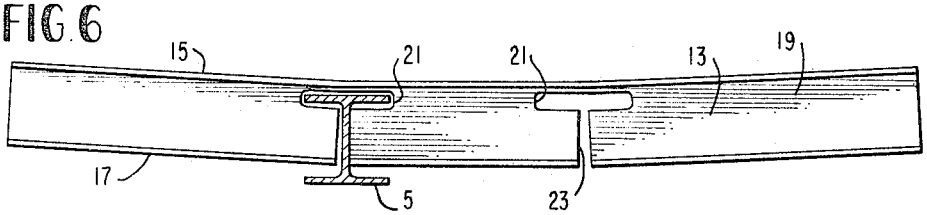
Figure 7:
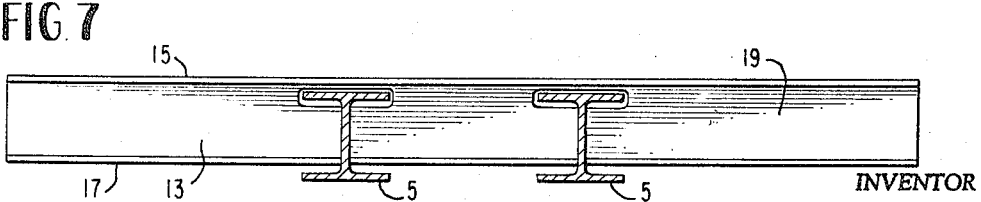

Fabrication and assembly of one form of a shear head according to the present invention are illustrated stepwise in FIGS. 5, 6 and 7. In FIG. 5, the cut member, which is second member 13, is shown after formation of the cuts as described above. In FIG. 6, the method of introduction of the first members 5 into those cuts is illustrated. Specifically, the second member 13, and particularly its upper flange 15, is bent to open the cut, as there is substantially no tolerance between the slot 23 and its contained web 11 in the assembled condition.

When both members 5 have thus been inserted into the cuts in both members 13, then the members 13 are closed up again by supporting the lower flange 17 between members 5, as seen in FIG. 7, and by applying downward pressure to upper flanges 15 at points adjacent the ends of upper flange 15. This places upper flange 15 in tension and lower flange 17 in compression because the marginal portions of lower flange 17 adjacent to member 5 press against the web 11 of member 5. It will be understood that the tight fit between member 13 and web 11 can also be obtained by interposing inserts between these portions, without departing from the scope of the invention. Welds 25 can then be formed to maintain the parts in this position.

Needless to say, the shear head can be assembled in a position inverted from that of FIGS. 5, 6 and 7.

The assembled shear head is then lowered over the top of column 1, as can best be appreciated from FIG. 4, until it rests on seats 3, to which it may be secured in any desired manner (not shown). Ordinarily, clearance between the shear head and column 1 will be maintained, as seen in FIG. 4. When the concrete is cast and the shear head is thus loaded with the ends of the members 5 and 13 in cantilever loading, it will be appreciated that the compression of the members 13 below their neutral line is transmitted without modification through the web 11 of members 5; while the tensile stresses of members 13 are substantially undisturbed because flanges 15 are intact. Of course, webs 19 are cut above the neutral line, which slightly weakens members 13, but only very slightly as the moments of inertia of the web above the neutral line are negligible compared to those of the flange 15.

There is thus provided a construction as strong as any that was possible heretofore, with much less labor cost.

The arrangement of the reinforcing bars 27 and 29 should also be noted. In the prior art, the reinforcing bars were stacked on each other above the plane of the highest member and below the plane of the lowest member. That is to say, that one layer of reinforcing rods rested on the upper flanges of the horizontal members while the other layer rested on top of that first layer at right angles thereto. Similarly, below the horizontal members, space had to be provided for two layers of reinforcing bars. But in the present invention, the upper reinforcing bars 27 need extend no higher than flange 15 of second member 13. It is thus necessary only to provide room for a single layer of bars 29 atop flange 15. Similarly, on the underside of the shear head, the bars 29 need not extend below flanges 9. Therefore, although the small vertical displacement of the intersecting horizontal members relative to each other, which characterizes the present invention, has on the one hand a tendency to increase the over-all vertical thickness of the assembly itself, the saving in height which can be realized by the unique arrangement of reinforcing bars, and which is equal to about three times the diameter of the bars, nullifies this increase in thickness and permits the use of a shear head whose advantages are not bought at the expense of an undesirably thick partition.

From a consideration of the foregoing disclosure, therefore, it will be evident that all of the initially recited objects of the present invention have been achieved.

Although the present invention has been disclosed and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A shear head comprising a column, a first horizontal member supported by the column, a second horizontal member supported by the first member, said second member having upper and lower flanges and an upright web interconnecting the flanges, the first member passing through the web and lower flange below the upper flange of the second member, at least the lower flange of the second member being in compression on opposite sides of the first member, first reinforcing bars perpendicular to the first member and disposed at least in part below the uppermost portions of said second member and spaced apart and parallel to each other and to the second member, and second reinforcing bars perpendicular to said first bars and disposed above said first bars.

2. A shear head as claimed in claim 1, said second bars resting on said upper flange of said second member.

3. A shear head as claimed in claim 1, and further first bars parallel to and spaced from each other and disposed beneath said second member, and further second bars perpendicular to and disposed beneath said second member and spaced from and parallel to each other and parallel to said first member and disposed above said further first bars and at least in part above the lowermost portions of said first member.

4. A shear head comprising a column, a pair of first horizontal members disposed one on either side of and supported intermediate their ends by the column, a pair of second horizontal members disposed on either side of the column and supported intermediate their ends by the first members, each said second member having upper and lower flanges and an upright web interconnecting the flanges, each said first member passing through the web and the lower flange below the upper flange of each said second member, at least the lower flange of each said second member being in compression on opposite sides of each said first member, first reinforcing bars perpendicular to each first member and spaced apart and parallel to each other and to each second member, and second reinforcing bars perpendicular to said first bars and disposed above said first bars.

5. A shear head as claimed in claim 4, said second bars resting on said upper flange of said second members.

6. A shear head as claimed in claim 4, and further first bars parallel to and spaced from each other and disposed beneath said second members, and further second bars perpendicular to and disposed beneath said second members and spaced from and parallel to each other and parallel to said first members and disposed above said further first bars and at least in part above the lowermost portions of said first members.

References Cited

UNITED STATES PATENTS

| | | | |
|---|---|---|---|
| 2,641,829 | 6/1953 | Sasso | 29—155 |
| 523,425 | 7/1894 | Cornell | 287—189.36 |
| 1,883,376 | 10/1932 | Hilpert et al. | 52—733 X |

BOBBY R. GAY, *Primary Examiner.*

DAVID J. WILLIAMOWSKY, *Examiner.*

A. CALVERT, *Assistant Examiner.*